United States Patent [19]

Martinez et al.

[11] 4,351,810

[45] Sep. 28, 1982

[54] METHOD FOR REMOVING SULFUR DIOXIDE FROM A GAS STREAM

[75] Inventors: Richard I. Martinez, Gaithersburg; John T. Herron, Germantown, both of Md.

[73] Assignee: The United States of America as represented by the Secretary of Commerce, Washington, D.C.

[21] Appl. No.: 281,745

[22] Filed: Jul. 9, 1981

[51] Int. Cl.³ .................... C01B 21/00; C01B 17/00; C01B 17/74
[52] U.S. Cl. .................... 423/235; 423/242; 423/522
[58] Field of Search ............... 423/522, 242 R, 243, 423/235 D; 549/34

[56] References Cited

U.S. PATENT DOCUMENTS 2,819,279  1/1958  Brown et al. .................... 568/430
4,191,732  5/1980  Uraweck et al. ................. 423/243
4,213,944  7/1980  Azuhata et al. ................ 423/235 D

FOREIGN PATENT DOCUMENTS 2703882  4/1977  Fed. Rep. of Germany ... 423/235 D
51-20068  2/1976  Japan ............................. 423/235

OTHER PUBLICATIONS

Cox et al., Aersol Formation from Sulfur Dioxide in the Presence of Ozone and Olefinic Hydrocarbons, J. Chem. Society (London), Faraday Trans., vol. 168, 1972, pp. 1735-1753.
Prager et al., Aersol Formation from Gaseous Air Pollutants, I. & E.C., vol. 52 #6, Jun. 60, pp. 521-524.

*Primary Examiner*—Gary P. Straub
*Attorney, Agent, or Firm*—Eugene J. Pawlikowski; Alvin J. Englert

[57] ABSTRACT

A method is provided for removing $SO_2$ from gas streams by its gas-phase reaction with a stabilized Criegee intermediate under conditions where a very large excess of water vapor is avoided, resulting in efficient scavenging of $SO_2$ by the Criegee intermediate to form an adduct. The adduct reacts with water vapor to convert it directly to sulfuric acid, which is then separated from the gas stream. The Criegee intermediate may be generated in a variety of ways.

16 Claims, 3 Drawing Figures

METHOD FOR REMOVING SULFUR DIOXIDE FROM A GAS STREAM

BACKGROUND OF THE INVENTION

The combustion of sulfur-containing fuels generates significant amounts of sulfur dioxide ($SO_2$). Oxides of nitrogen ($NO_x$) are also often generated in the course of the combustion of various fuels. Without appropriate treatment of the exhaust gases of combustion, large amounts of sulfur and nitrogen oxides would be injected into the atmosphere, causing a variety of ecological problems.

Various processes have been developed to remove $SO_2$ and $NO_x$ from exhaust gases. Ozone has been used to oxidize nitrogen oxides in waste gas streams, e.g., in the process of U.S. Pat. No. 4,035,470. Olefins have been used in a gas phase process for removing sulfur dioxide from gases, e.g., in the process of U.S. Pat. No. 4,191,732. Electron beam irradiation has been used to activate nitrogen and sulfur oxides, followed by reaction with ammonia, e.g., in the process disclosed by Kawamura et al., *Environ. Sci. Tech.*, 14, 288 (1980).

Studies of the oxidation of sulfur dioxide in the atmosphere have been reported by Cox et al., *J. Chem. Soc. Faraday Trans.*, 168, 1735 (1972), and by Calvert et al., *Atmos. Environ.*, 12, 197 (1978). Both articles based their analyses on the assumption that the oxidation of sulfur dioxide proceeds through the formation of sulfur trioxide, which is then hydrated to form sulfuric acid, although Cox et al. recognized the difficulty with this assumption. Neither Cox et al., nor Calvert et al. were able to satisfactorily explain apparently inconsistent observations in the ozone-alkene-$SO_2$ system. Accordingly, predictions based on either of their analyses would not permit control of this reaction, and in particular, would not lead to the combination of steps necessary to effect the present process. Neither Cox et al. nor Calvert et al. envisioned a process for removing $SO_2$ from a gas stream such as an exhaust gas or flue gas stream.

A need therefore continues to exist for a simple, homogeneous gas-phase process capable of removing $SO_2$ from a variety of gas streams including, but not limited to, exhaust gases from combustion processes.

OBJECTS OF THE INVENTION

It is an object of the present invention to provide a method of removing $SO_2$ from a gas stream in a continuous process which does not necessitate the use of catalysts, complex temperature control or lime solutions or slurries.

Another object of the present invention is to permit a power plant to use fuels having either low or high sulfur contents without necessitating any pretreatment of a high sulfur fuel.

A further object of the invention is to provide a method of removing $SO_2$ and $NO_x$ from a gas stream using the same reactants.

Upon further study of the specification and appended claims, further objects and advantages of this invention will become apparent to those skilled in the art.

SUMMARY OF THE INVENTION

Briefly, these and other objects of the invention may be achieved by a method of removing $SO_2$ from a gas stream, which comprises the steps of:

(a) adjusting the moisture content of the gas to not more than about 1000 times the $SO_2$ concentration;

(b) contacting the gas stream with a stabilized Criegee intermediate, thereby scavenging the $SO_2$ in the gas and forming a Criegee-$SO_2$ adduct;

(c) adjusting the moisture content of the gas stream to at least 2 times the initial $SO_2$ concentration to convert the adduct directly to $H_2SO_4$; and (d) separating the resultant $H_2SO_4$ from the gas stream.

DETAILED DISCUSSION

Figure 1:
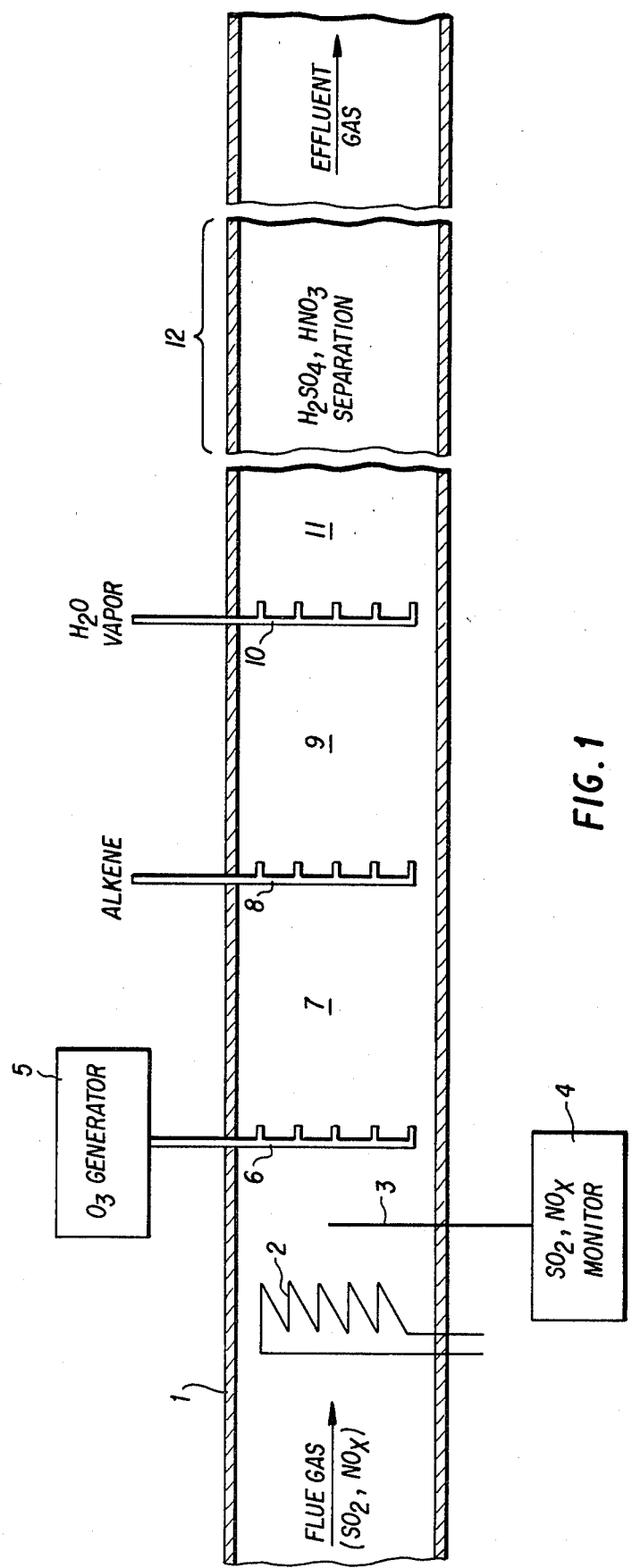
FIG. 1 is a schematic diagram of an embodiment of the present method using ozone and an alkene to generate the Criegee intermediate.

It has now been found that sulfur dioxide is very efficiently scavenged from a gas stream by a stabilized Criegee intermediate ($CR_o$). The Criegee intermediate (CR) has been implicated in the reaction of ozone with alkenes to produce secondary ozonides (SOZ), as shown in reactions (1)-(3):

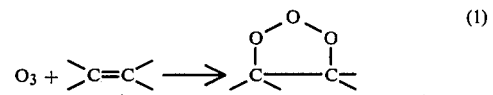

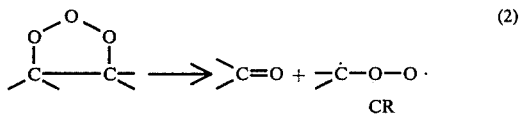

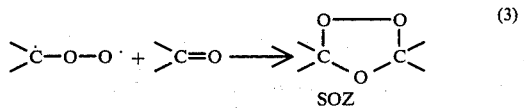

Ozone reacts with an alkene in a 1,3-diradical addition process to produce a first intermediate denoted a primary ozonide, or 1,2,3-trioxolane, as shown in reaction (1). This initially formed intermediate decomposes rapidly to an oxoalkane and a Criegee intermediate, in reaction (2), which then may react further with the oxoalkane to form the secondary ozonide, which is a 1,2,4-trioxolane, in reaction (3).

The initially formed Criegee intermediate, in gas-phase reactions, will normally have sufficient internal energy to decompose to various molecular and free-radical products, as is in fact observed at low pressures. This "hot" Criegee intermediate (CR*) can be collisionally stabilized to varying degrees, however, depending on the pressure. It is likely that sulfur dioxide is scavenged by a stabilized Criegee intermediate, and not by the initially-formed "hot" Criegee intermediate. Scheme I includes this more detailed sequence, as well as other reactions to be discussed below.

SCHEME I

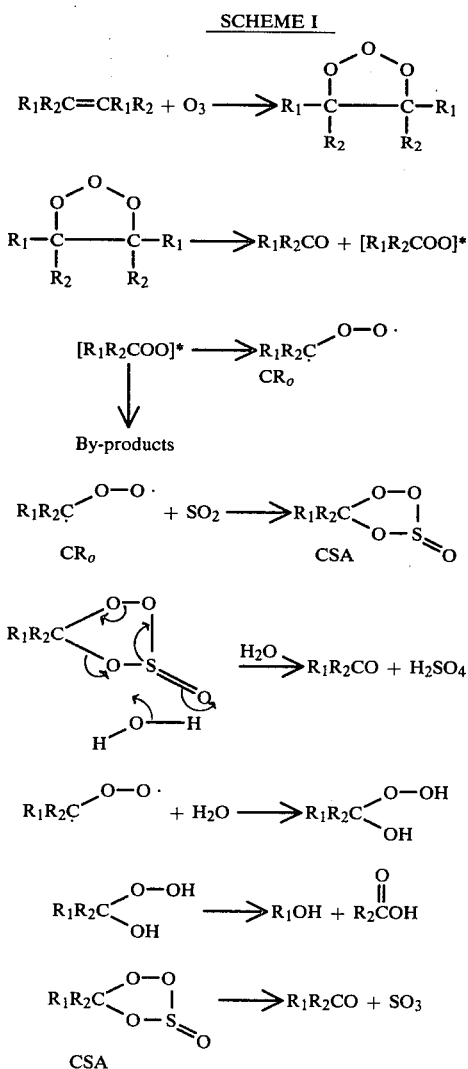

Scheme I reveals several new insights by the present inventors into the detailed mechanism of this reaction. First, the kinetic results and competition experiments which have been done in the past, and other experiments performed by the present inventors, are best explained by the assumption that it is the stabilized Criegee intermediate which is principally responsible for scavenging $SO_2$ to form a Criegee-$SO_2$ adduct (CSA), according to reaction (7).

The alkene shown in reaction (4) is a symmetrical alkene, where $R_1$ and $R_2$ are each independently H or $C_{1-10}$ alkyl, preferably H, $CH_3$ or $C_2H_5$, but the extension to an unsymmetrical alkene, $R_1R_2C=CR_3R_4$, where $R_1-R_4$ are each independently H or $C_{1-10}$ alkyl, preferably H, $CH_3$ or $C_2H_5$, is readily apparent, it being possible to form two different Criegee intermediates and two different carbonyl compounds from the decomposition of the initial ozonide formed in reaction (4). Factors influencing the choice of alkene include volatility and the stability of the resultant Criegee intermediate.

In a significant departure from prior art thinking, the present inventors formulate the formulation of sulfuric acid as resulting from a concerted reaction of water with the CSA to form an oxoalkane and sulfuric acid directly, according to reaction (8). This is important because it is well known that sulfur trioxide ($SO_3$) reacts only slowly with water to produce sulfuric acid. Thus, reaction (11) cannot be an important pathway for sulfuric acid production in this system, directly contrary to the assertion of Calvert et al.

Scheme I also shows that excessive moisture may divert some of the stabilized Criegee intermediate via reactions (9) and (10). Only as a consequence of the detailed mechanistic interpretation of this reaction, summarized in Scheme I, is it possible to understand and control this reaction, and especially to understand and control the effect of water vapor. Thus, the concentration of water vapor must be relatively low when the Criegee intermediate is generated to minimize its diversion, but it should be higher after the CSA is formed to effect its hydrolysis to oxoalkane and sulfuric acid.

The detailed steps of the present process will be discussed with reference to several embodiments, for illustrative purposes only. A flue gas stream containing 1000 ppm $SO_2$ and 1000 ppm $NO_x$, corresponding to a "worst case" condition, is used for the purpose of showing the efficiency of the process. The discussion assumes pseudo-first-order conditions to illustrate the estimation of parameters for the various reactions involved in the gas treatment process.

Residence times of the gas in various stages of the process are expressed in $t_{99}$ values, where $1t_{99}$ corresponds to the time required to remove 99% of the particular component from the system, leaving 1% in the gas stream. Thus, after $2t_{99}$, only $10^{-2}$% of the component remains, after $3t_{99}$, only $10^{-4}$% remains, and so forth. Thus, if the residence time of the gas stream in that section of the reactor corresponds to $nt_{99}$ units, the reaction component will be reduced to $10^{-2n}$ of its original concentration.

In the process illustrated in FIG. 1, the Criegee intermediate is generated by the reaction of ozone and an alkene, and shows the combined removal of $SO_2$ and $NO_x$ from the gas stream. It will be apparent to one of ordinary skill in the art that a gas stream which contains $SO_2$ but is substantially free of nitrogen oxide may be treated analogously, with appropriate modifications in the amounts of reactant and the further processing of the effluent. Similarly, it will be apparent that either ozone or alkene may be in excess in segment 9 of FIG. 1, depending on the specific operating design of the exhaust gas treatment plant.

Referring now to FIG. 1, a flue gas containing 1000 ppm $SO_2$ and 1000 ppm $NO_x$, and typically containing oxygen, carbon dioxide and water vapor, as well as suspended solids, is introduced into the inlet end of the reactor 1, which may be a continuous pipe, as shown, or may be any combination of pipes, reaction chambers, and the like. The temperature of the gas is regulated by means of heat exchanger 2 so that it is no higher than about 150° C. Of course, if a $SO_2$-containing gas to be treated by the present method is below 150° C., no cooling may be necessary. Above 150° C., there is excessive decomposition of ozone.

An additional function of the cooling is to reduce the moisture content of the gas to a concentration no higher than about 1000 times, preferably no higher than about 100 times the concentration of $SO_2$ in the gas. Cooling below 100° C. may be necessary to effect sufficient condensation of moisture to reduce its content to the desired level. The reduction in moisture content serves the purpose of minimizing competition between water and $SO_2$ for the stabilized Criegee intermediate, that is, reducing the diversion of $CR_0$ by reactions (9) and (10), and maximizing the scavenging of $SO_2$ by reaction (7). Reaction (7) has a rate constant which is estimated to be about $10^4$ times faster than reaction (9), and a concentration of water vapor in the gas stream which is more than about 1000 times the concentration of $SO_2$ will divert sufficient Criegee intermediate so that the scavenging by $SO_2$ becomes less efficient. Obviously, if the excess of water over $SO_2$ approaches $10^4$, relatively large amounts of Criegee intermediate will be necessary to scavenge even 50% of the $SO_2$ in the gas stream, and substantial amounts of by-products will also be generated. Thus, the upper limit of 1000 for the ratio of water vapor to $SO_2$ in the dehumidified gas stream (in the region between the heat exchanger 2 and ports 6) is a suggested practical limit, above which the present process may not be cost effective. This in no way limits the scope of equivalents comtemplated for this process.

A sampling pipe 3 and an analytical detector 4 are used to monitor the $SO_2$ and $NO_x$ contents of the cooled gas, and may be linked (not shown) with the metering devices for ozone and alkene. Depending on the $SO_2$ concentration and the concentration of any $NO_x$ in the gas, the necessary amount of ozone is generated in ozone generator 5 and introduced into the reactor through one or more ports 6. Advantageously, reagents are introduced into the reactor so as to maximize their dispersion into the gas stream, e.g., by means of a multi-orifice pipe, and the like. The ozone is generally prepared in a conventional ozone generator, which usually produces 5–10% $O_3$ in $O_2$.

In the section of the reactor 7, immediately downstream of the ozone inlet, oxides of nitrogen are converted to nitric anhydride and, to some extent, to nitric acid by reactions (12)–(16).

$$NO + O_3 \rightarrow NO_2 + O_2 \quad (12)$$

$$NO_2 + O_3 \rightarrow NO_3 + O_2 \quad (13)$$

$$NO_3 + NO \rightarrow 2NO_2 \quad (14)$$

$$NO_2 + NO_3 \rightarrow N_2O_5 \quad (15)$$

$$N_2O_5 + H_2O \rightarrow 2HNO_3 \quad (16)$$

The amount of ozone added through ports 6 will depend on the amounts of $SO_2$ and $NO_x$ detected by monitor 4. In general, about 2 moles of ozone per mole of NO are needed to convert the NO to $HNO_3$.

The amount of additional ozone necessary for generation of the Criegee intermediate depends upon the structure of the alkene used, since this will determine what percentage of "hot" Criegee intermediate is stabilized, and what portion has sufficient energy to decompose to other products. For a terminal olefin such as ethylene or propylene, about 0.2 mole of stabilized Criegee intermediate is produced per mole of alkene consumed by the ozone, corresponding to about 40% stabilization of the initially-formed "hot" Criegee intermediate. The more highly substituted olefins, such as 2,3-dimethyl-2-butene (tetramethylethylene, TME) generally stabilize more readily, so that nearly about 0.4 mole of stabilized Criegee intermediate is produced per mole of substituted alkene consumed by the ozone. Thus, about 2–5 moles of ozone are required per mole of $SO_2$, in addition to that required for $NO_x$.

The length of section 7 of the reactor is readily calculated for any given exhaust gas flow rate and specific reactor design. Assuming 6000 ppm of ozone are used to remove the NO and $SO_2$ for the aforementioned "worst case" example of 1000 ppm NO and 1000 ppm $SO_2$, then the $t_{99}$ for reaction (12) is about $1.2 \times 10^{-4}$ sec. and the $t_{99}$ for reaction (13) is about $7.6 \times 10^{-3}$ sec., at 400 K. (127° C.). If one assumes, for example, a gas flow rate of about 6000 scfm (about 2800 l-atm/sec.) in a 6 m-diameter cylindrical reactor, the length of segment 7 necessary to achieve 99% conversion of the $NO_x$, $\Delta L_7$, is about $1.2 \times 10^{-3}$ cm for reaction (12) and $7 \times 10^{-2}$ cm for reaction (13). Lowering the temperature will result in a concomitant increase in the length of segment 7 to compensate for the reduced reaction rate.

The gas stream at the downstream end of segment 7 of the reactor now contains an excess of ozone and the $NO_x$ oxidation products, together with $SO_2$ and the other components of the gas stream. The alkene used to react with ozone and generate the Criegee intermediate is injected as homogeneously as possible, e.g., through a perforated cylindrical pipe 8 situated perpendicular to the direction of flow of the gas stream, or by means of a rotating impeller, and the like, so that the alkene is thoroughly and rapidly mixed with the ozone-containing stream. The alkene reacts with ozone to form the Criegee intermediate by reactions (4)–(6) of Scheme I.

In principle, any readily available gaseous alkene may be used to generate the Criegee intermediate. However, considerations of practicality strongly suggest that lower alkenes be used. Economic considerations would suggest ethylene, but its rate of reaction with ozone and the degree of stabilization of the resultant Criegee intermediate are lowest for ethylene. The more highly substituted alkenes react more rapidly and are more completely stabilized. Propylene, whose production volume is second to that of ethylene, offers a useful compromise and is advantageously used. TME, or any other volatile tetrasubstituted ethylene, would be ideal although more expensive. A butenes fraction from a petroleum refining process, e.g., from a cracking process, is also an attractive source of alkenes, especially if it is rich in the more highly substituted 2-butenes and/or isobutene.

The Criegee intermediates generated in situ in segment 9 of the reactor scavenge any $SO_2$ in the gas stream and convert it to the Criegee-$SO_2$ adduct (CSA) by reaction (7). Because the concentration of water vapor has been reduced prior to this step, reactions (9) and (10) are minimized. Reactions (3) and (11) are also minor, negligible pathways. On the other hand, the free-radical activity of ozone-alkene systems further contributes to the conversion of $NO_x$ to $HNO_3$ by reactions such as (17)–(20).

$$HO + O_3 \rightarrow HO_2 + O_2 \quad (17)$$

$$HO_2 + NO \rightarrow NO_2 + HO \quad (18)$$

$$HO_2 + O_3 \rightarrow HO + 2O_2 \quad (19)$$

$$HO + NO_2 \rightarrow HNO_3 \quad (20)$$

The length of segment 9 of the reactor may be calculated from the rate constants for the overall reaction represented by reactions (4)–(6) and the estimated rate constant for reaction (7). Assuming 6000 ppm of ozone are used for the aforementioned "worst case" example, the $t_{99}$ for reactions (4)–(6) is about $3 \times 10^{-2}$ sec. for TME, and $t_{99}$ for reaction (7) is about $1 \times 10^{-5}$ sec. At 400 K. and the aforementioned flow rate of 6000 scfm in a 6 m-diameter cylindrical reactor, the length of segment 9, $\Delta L_9$, to achieve 99% reaction of ozone with TME is about $3 \times 10^{-1}$ cm, while the reactor length for achieving 99% scavenging of $SO_2$ by the resultant stabilized Criegee intermediate is about $1 \times 10^{-4}$ cm. It will be understood that less substituted alkenes produce Criegee intermediates more slowly and a smaller percentage of the initially formed "hot" Criegee intermediate is stabilized, requiring longer path lengths for effective scavenging. However, these may be readily determined, either by calculation based on rate constants for reaction of the alkene with ozone and for stabilization and reaction of the Criegee intermediate, or may be readily determined by on-line monitoring of the $SO_2$ level downstream from the alkene inlet, at some point toward the downstream end of segment 9.

Once the CSA is formed, it reacts with water in a concerted fashion to produce an oxoalkane and sulfuric acid, by reaction (8). At this stage, the moisture content of the gas stream is adjusted to at least 2 times the initial $SO_2$ concentration. Advantageously, additional water vapor is introduced through inlet ports 10 to effect this reaction and to convert the nitric anhydride in the gas stream to nitric acid. The conversion of the CSA and the nitric anhydride to sulfuric and nitric acids is completed in segment 11 of the reactor. The reaction of the CSA with water is very fast, while the hydration of the nitric anhydride is relatively slow. Assuming the aforementioned flow rate of 6000 scfm in a 6 m-diameter cylindrical reactor, and assuming further that sufficient water vapor is injected through 10 to increase its concentration to a partial pressure of about 100 torr, then the $t_{99}$ for reaction (16) is about 146 sec., necessitating a $\Delta L_{11}$ of about 14 meters for 99% reaction. The hydration of the CSA is completed within the first centimeter or two. More or less water vapor may be used, depending upon the specific reactor design of the exhaust gas treatment plant, the concentration of the CSA and the nitric anhydride, and in light of the subsequent treatment of the stream to separate sulfuric and nitric acids. It may not be necessary to add water vapor at all if its concentration is sufficiently high.

The resultant $SO_2$-free and $NO_x$-free gas stream, containing sulfuric and nitric acids as an aerosol, is now treated in segment 12 of the reactor in one of a variety of ways depending on which commercially marketable byproduct is desired. These various methods of separating sulfuric and nitric acids from a gas stream are well known in the art, and they will be discussed briefly at a later point.

An alternative source of Criegee intermediates is the gas phase reaction of ozone with a volatile aldehyde, e.g., $R_5CHO$, wherein $R_5$ is H or $C_{1-10}$-alkyl, preferably $C_{1-3}$ alkyl, according to a mechanism which is believed to be represented by reactions (21) and (22).

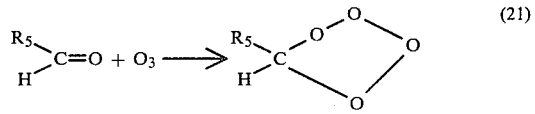
(21)

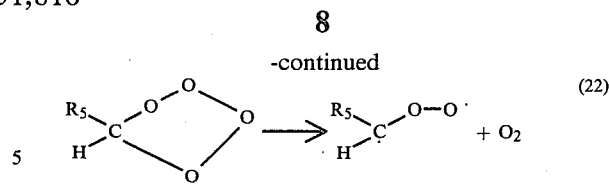
(22)

While this does not appear to be as convenient as the reaction of an alkene with ozone as a source of Criegee intermediates, it illustrates the versatility of the present method. The aldehyde is introduced instead of the alkene through inlet port 8 of FIG. 1. For the same temperature and flow rate as above, the $t_{99}$ for formation of the Criegee intermediate by reactions (21)–(22) is about 1200 sec., using the same low aldehyde concentration as was used for the alkene. In that case, $\Delta L_9$ for formation of the Criegee intermediate to the extent of 99% would be about 115 meters. Increasing the aldehyde concentration would shorten the pathlength, since the rate of formation of Criegee intermediates would increase proportionally. Use of excess aldehyde, e.g., acetaldehyde, would result in a substantial amount of the aldehyde being present in the effluent gas, and it could either be recovered and recycled or burned as auxiliary sulfur-free fuel.

Figure 2:
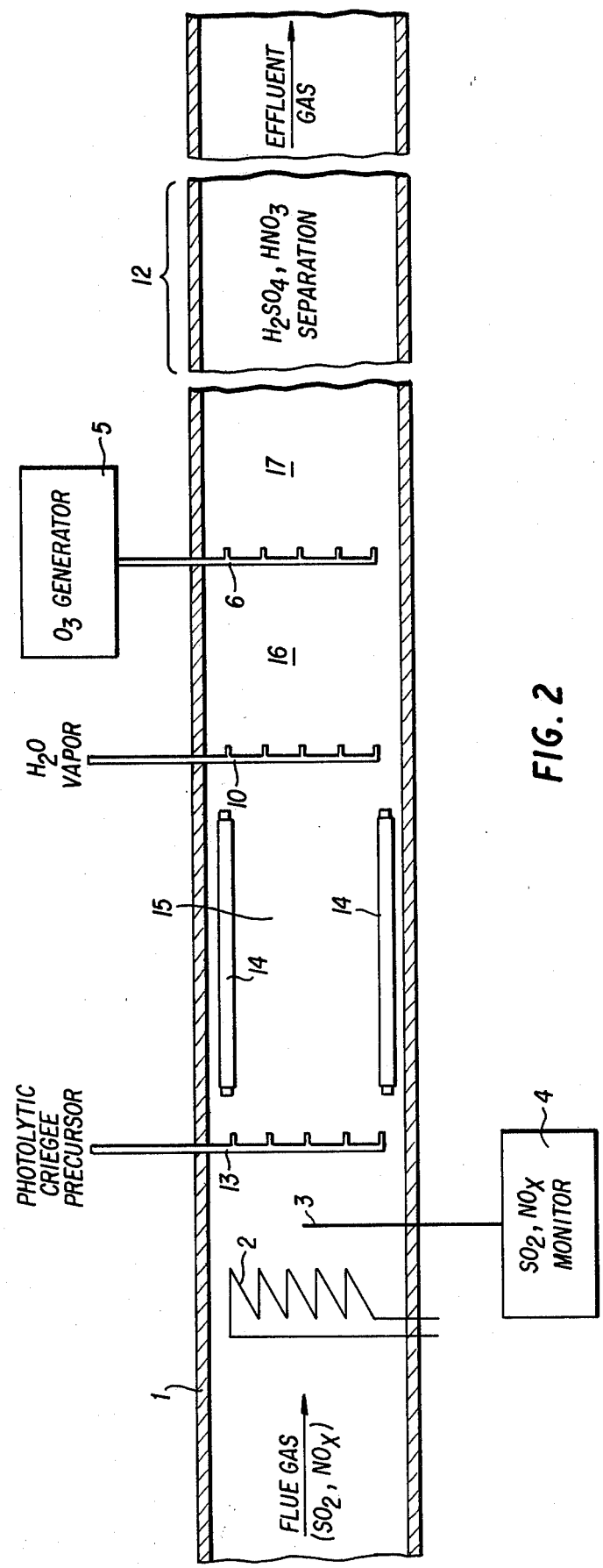
FIG. 2 is a schematic diagram of an alternative embodiment of the invention, using a photolytic process to generate the Criegee intermediate.

The embodiment illustrated in FIG. 2 relies on a photolytic process for generating the Criegee intermediate. For example, ketene can be photolyzed to produce a carbene, which can then react with oxygen to generate the Criegee intermediate usually accompanied by thermal decomposition products, according to reactions (23)–(25).

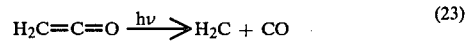
(23)

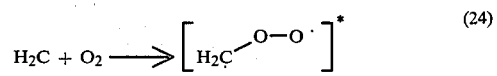
(24)

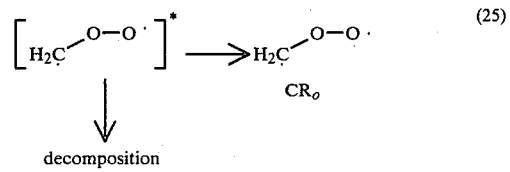
(25)

A $SO_2$-containing gas stream, e.g., a flue gas stream which may also contain $NO_x$, is cooled, if necessary, to a temperature of 150° C. or lower, and its moisture content reduced, substantially as described above.

A photolytic Criegee precursor, e.g., ketene, is introduced into the gas stream through inlet ports 13. Other compounds which may be photolyzed in the gas phase to produce a carbene ($CH_2$), preferably a triplet carbene, may be used instead of ketene. Diazomethane is another example of a photolytic carbene precursor, although there are obvious handling problems associated with its use.

Assuming that ketene is the precursor, it is irradiated with high intensity ultraviolet radiation, e.g., using UV lamps 14 suitably positioned in the interior of segment 15 of the reactor. Ketene absorption in the UV extends from about 2700 Å to about 3600 Å, with $1 \leq \epsilon \leq 12$, and with a maximum at 3300 Å. More intense broad-band UV sources may be used, depending on the engineering design of the particular treatment plant. Thus, for example, a partial pressure of about 8 torr of ketene and a photon intensity of about $5 \times 10^{23}$ photons per second, at 3130 Å, should produce about $5 \times 10^{23}$ molecules per second of methylene (CH$_2$) in a reactor having a 6 meter diameter and a 27 meter path length for segment 15.

The gas stream should contain about 100–300 torr O$_2$, preferably about 120–200 torr. The reaction of methylene with oxygen according to reaction (24) has a $t_{99}$ of about $8 \times 10^{-6}$ seconds for an O$_2$ partial pressure of 160 torr, which is provided by atmospheric air, so that the corresponding path length for this reaction is about $8 \times 10^{-5}$ cm for the 6000 scfm flow rate of the "worst case" example. Either air or oxygen may be injected into segment 15 if necessary to raise the O$_2$ partial pressure in the gas stream.

It is reasonable to assume that about 10% of the initially generated "hot" Criegee intermediate produced according to reactions (23) and (24) is stabilized according to reaction (25), at atmospheric pressure. The stabilized Criegee intermediate generated by the reaction of the carbene and oxygen in segment 15 will scavenge sulfur dioxide to form the CSA. Water vapor is then injected through injection ports 10 to convert the CSA to sulfuric acid by reaction (8) in segment 16 of the reactor. Ozone is then added from ozone generator 5 and injection ports 6 to convert the NO$_x$ in the gas stream to nitric anhydride and nitric acid in segment 17.

Again, the SO$_2$-free and NO$_x$-free gas containing sulfuric and nitric acids is separated in segment 12, with removal of the sulfuric and nitric acids by the various methods to be discussed below.

Figure 3:
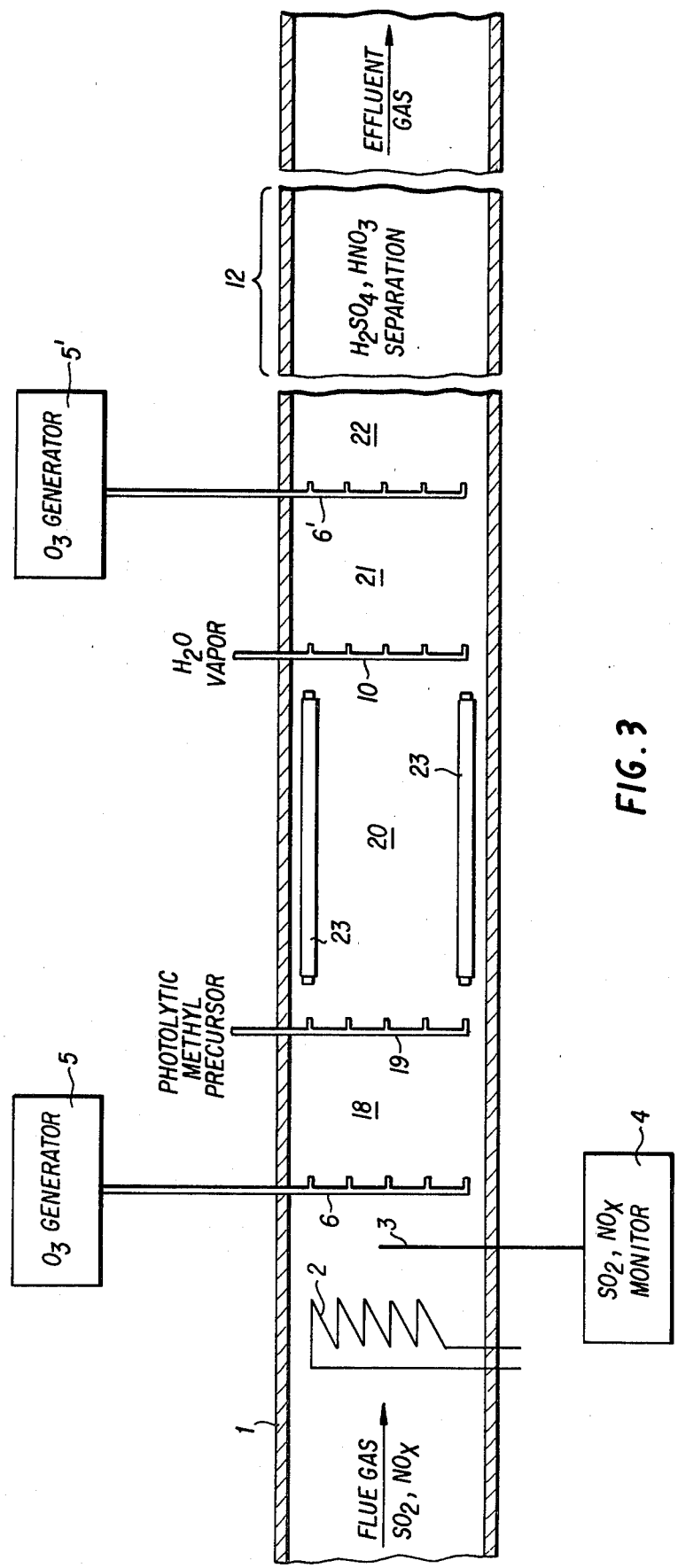
FIG. 3 is a schematic diagram of an embodiment using a different photolytic process to generate the Criegee intermediate.

An alternative photolytic process is illustrated in FIG. 3, and involves generating methyl radicals which then react with ozone to form a Criegee intermediate by the reactions of Scheme III.

SCHEME III

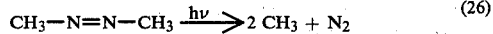
(26)

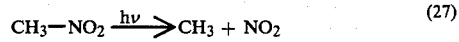
(27)

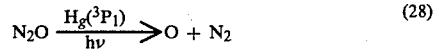
(28)

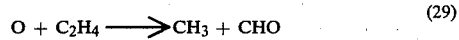
(29)

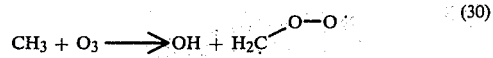
(30)

Methyl radicals may be generated by any of a variety of well-established pathways. Reactions (26) and (27) and reactions (28) plus (29) illustrate three alternative pathways for generating methyl radicals. In reaction (26), dimethylazide is photolyzed to produce methyl radicals and nitrogen. Reaction (27) is the photolysis of nitromethane to form methyl radical and NO$_2$. Reaction (28) is the mercury photosensitized decomposition of nitrous oxide to form N$_2$ and oxygen atoms, which react with ethylene to produce methyl radicals and formyl radicals, as shown in reaction (29). Under the preferred wavelength for irradiation, there may be appreciable photolysis of the ozone, for which corrective measures may be required, e.g., the use of radial injection of ozone into the photolysis region to minimize its residence time therein, and/or the use of pure ozone to compensate for its photolysis. The methyl radicals, from whatever source, react with ozone to produce hydroxyl radicals and Criegee intermediates, as shown in reaction (30).

In the embodiment illustrated in FIG. 3, the initial cooling and moisture adjustment of the flue gas is effected in much the same way as the previous examples. Ozone is introduced into the cooled and moisture-adjusted gas from ozone generator 5 through injection ports 6. The reaction of ozone with oxides of nitrogen according to reactions (12)–(16), as discussed above, is effected in reactor segment 18, with the same parameters being used as in the earlier example.

A photolytic methyl precursor, e.g., dimethylazide, nitromethane, or a mixture of nitrous oxide and ethylene, is added through inlet ports 19 and photolyzed using UV lamps 23. Reactions (26), (27) or reactions (28) plus (29) occur to generate methyl radicals in reactor segment 20, which reacts with ozone to form stabilized Criegee intermediates, according to reaction (30). The photolysis of nitrous oxide is effected by mercury sensitized photolysis, advantageously at wavelengths in the neighborhood of 2537 Å, while the photolysis of dimethylazide is advantageously effected at wavelengths in the vicinity of 3400 Å. Photolysis of nitromethane is advantageously effected at about 3130 Å, although this method of generating the Criegee intermediate introduces additional oxides of nitrogen into the system.

The calculation of the optimal path lengths and concentrations for the species are effected by conventional methods, such as those illustrated above. Alternatively, monitoring of the SO$_2$ and NO$_x$ contents of the gas stream at the downstream end of segment 20 may be effected to determine the efficacy of their removal.

Water vapor is added through inlet port 10 to effect reactions (16) and (8) in reactor segment 21. Because some photolysis of nitrogen oxides occurs in segment 20, additional ozone is generated in ozone generator 5' and added through inlet ports 6' to reoxidize any lower oxides of nitrogen which may remain in the system, in reactor segment 22. The SO$_2$-free and NO$_x$-free gas stream containing sulfuric and nitric acids is separated in reactor segment 12, to produce an effluent gas stream and recovered sulfuric and nitric acids or reaction products thereof.

The foregoing examples are intended to illustrate the broad possibilities for the present method, without in any way limiting the many ways in which the process can be varied or utilized, as will be evident to the skilled art worker. Thus, the choice of reactor dimensions, configurations, components, methods of generating the Criegee intermediate, and the like, may be adapted to the exigencies of the gas to be treated, the availability of various materials, and other factors which will be apparent to an engineer designing a system of this general type. Where the gas flow rate and/or NO$_x$ and SO$_2$ concentrations are smaller than those discussed above, the configuration of the system set forth above would still be appropriate, although modifications may be indicated in the interest of better space utilization and/or other design parameters of interest.

Treatment of the gas stream containing sulfuric and nitric acids in order to separate the acids from the remainder of the gas stream may be effected in a variety of ways depending on which commercially marketable by-product is desired. These methods of treatment are conventional, and are not part of the present invention. Accordingly, the separation processes discussed below are merely illustrative, and other methods may be substituted if desired.

The gas stream containing sulfuric and nitric acids may be sparged with water, thereby producing an aqueous solution of sulfuric and nitric acids whose concentration may be varied. The nitric acid may be separated and concentrated, if desired, by distillation from the aqueous nitric-sulfuric acid solution. The aqueous acid solutions may be converted to aqueous solutions of any desired nitrate or sulfate salt by titration with the appropriate base. This would of course include aqueous solutions of ammonium sulfate and ammonium nitrate, if desired.

An alternative treatment for removing sulfuric and nitric acids from the gas stream is disclosed in the Kawamura et al. article cited above. This method involves injection of gaseous ammonia into the gas stream in reaction segment 12, to produce solid $(NH_4)_2SO_4$ and $(NH_4)_2SO_4 \cdot 2NH_4NO_3$ which can be readily separated from the gas stream by means of an electrostatic precipitator. These solid salts are used as components of commercial fertilizers.

Once the sulfuric and nitric acids have been removed from the gas stream by either of the foregoing treatments or another conventional separation process, the effluent gas stream contains primarily the by-products of the reactions used to generate the Criegee intermediates. In the case of an ozone-alkene system, excess ozone and oxoalkane by-products will be present. For many typical applications of the $SO_2$ removal process described herein, the $SO_2$ and $NO_x$ concentrations, and therefore also those of the $O_3$ and oxoalkane, are on the order of 1000 ppm or less. Hence, there may not be sufficient justification to recover the oxoalkane or to recycle the excess ozone, although this may be accomplished by standard techniques when they are present at higher concentrations. For more typical applications, before the effluent gas stream is released to the atmosphere, the $O_3$ and oxoalkane can be readily destroyed by passage through a high temperature combustor, e.g., by heat exchange with the firebox of a steam-generating boiler in a power plant. Alternatively, e.g., for a power-generating plant, the effluent gas stream containing the excess $O_3$ and oxoalkane may be utilized as the "combustion air" of a "clean" utility boiler, e.g., one using very low-sulfur fuels.

From the foregoing description, one skilled in the art can easily ascertain the essential characteristics of the present invention and, without departing from the spirit and scope thereof, can make various changes and modifications of the invention to adapt it to various usages and conditions.

What is claimed is:

1. A method of removing $SO_2$ from an industrial flue gas, exhaust gas or waste gas stream, which comprises the steps of:
   (a) determining the moisture content of the gas, and, where the moisture content is more than about 1000 times the $SO_2$ concentration, reducing the moisture content below about 1000 times the $SO_2$ concentration;
   (b) contacting the gas stream with an amount of a stabilized Criegee intermediate sufficient to scavenge the $SO_2$ in the gas and form a Criegee-$SO_2$ adduct, the diversion of the stabilized Criegee intermediate by water being less than about 10%;
   (c) hydrolysing the Criegee-$SO_2$ adduct at an $H_2O$ concentration of at least 2 times the initial $SO_2$ concentration, to convert the adduct directly to $H_2SO_4$ and oxoalkane; and
   (d) separating the resultant $H_2SO_4$ from the gas stream.

2. The method of claim 1, wherein in step (a), the temperature of the gas stream is adjusted to not more than about 150° C., and ozone is introduced into the gas stream in an amount of at least about 4 moles per mole of $SO_2$ and at least about an additional 2 moles per mole of any $NO_x$ in the gas stream, thereby converting at least a portion of the $NO_x$ to $NO_2$, $N_2O_5$ or $HNO_3$; wherein in step (b), a compound or radical capable of reacting with ozone to generate a stabilized Criegee intermediate is introduced into the gas stream; and wherein in step (d), any $HNO_3$ is also separated from the gas stream.

3. The method of claim 2, wherein in step (b), said compound is an alkene having the formula $R_1R_2C=CR_3R_4$, wherein $R_1$, $R_2$, $R_3$ and $R_4$ are each independently H or $C_{1-10}$ alkyl; and the stabilized Criegee intermediate has the formula

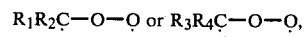

wherein $R_1$, $R_2$, $R_3$ and $R_4$ are as defined hereinabove.

4. The method of claim 3, wherein $R_1$, $R_2$, $R_3$ and $R_4$ are each independently H, $CH_3$ or $C_2H_5$.

5. The method of claim 3, wherein the alkene is tetramethylethylene.

6. The method of claim 3, wherein the alkene is propylene.

7. The method of claim 3, wherein the alkene is a butenes fraction from a petroleum refining process.

8. The method of claim 2, wherein in step (b), said compound is an aldehyde having the formula $R_5CHO$, wherein $R_5$ is H or $C_{1-10}$-alkyl.

9. The method of claim 8, wherein $R_5$ is $C_{1-3}$ alkyl.

10. The method of claim 1, wherein in step (b), the stabilized Criegee intermediate is generated by photolysis of ketene or diazomethane, in the presence of oxygen.

11. The method of claim 2, wherein in step (b), said radical is $CH_3$, generated by mercury-sensitized decomposition of $N_2O$ in the presence of an alkene, or by photolysis of nitromethane or dimethylazide.

12. The method of claim 1, wherein in step (a), the moisture content is reduced below about 100 times the $SO_2$ concentration when the initially determined moisture content is more than about 100 times the $SO_2$ concentration in the gas stream; whereby diversion of the stabilized Criegee intermediate by water in step (b) is less than about 1%.

13. The method of claim 1, which further comprises the step of passing the effluent from step (d) through a high temperature combustor.

14. The method of claim 1, which further comprises the step of feeding at least a portion of the effluent from step (d) as combustion air to a clean utility boiler.

15. The method of claim 1, wherein additional water vapor is introduced in step (d) to increase the rate of hydrolysis of the Criegee-$SO_2$ adduct.

16. The method of claim 12, wherein additional water vapor is introduced in step (d) to increase the rate of hydrolysis of the Criegee-$SO_2$ adduct.

* * * * *